United States Patent
Patel et al.

(10) Patent No.: US 8,401,518 B1
(45) Date of Patent: Mar. 19, 2013

(54) VARIABLE BILLING OF MMS MESSAGES IN WIRELESS NETWORK COMMUNICATION SYSTEM BASED ON MESSAGE FORMATION APPLICATION

(75) Inventors: Biren Patel, San Ramon, CA (US); Sivakumar Kolli, Walnut Creek, CA (US)

(73) Assignee: Cellco Partnership, Basking Ridge, NJ (US)

( * ) Notice: Subject to any disclaimer, the term of this patent is extended or adjusted under 35 U.S.C. 154(b) by 519 days.

(21) Appl. No.: 12/603,944

(22) Filed: Oct. 22, 2009

(51) Int. Cl.
*H04M 11/00* (2006.01)

(52) U.S. Cl. ....................... 455/406; 455/405

(58) Field of Classification Search .......... 455/405, 455/406, 408, 466; 709/206, 207, 224, 231
See application file for complete search history.

(56) References Cited

U.S. PATENT DOCUMENTS

| | | | | |
|---|---|---|---|---|
| 2004/0204135 | A1* | 10/2004 | Zhao et al. | 455/566 |
| 2009/0066509 | A1* | 3/2009 | Jernstrom et al. | 340/568.1 |

* cited by examiner

*Primary Examiner* — George Eng
*Assistant Examiner* — Jing Gao

(57) ABSTRACT

A wireless mobile communication device may include a transmitter configured to wirelessly transmit MMS messages over a wireless network communication system. The device may also include a plurality of user applications. Each user application may be of a different type and configured to generate content for an MMS message based on input to the wireless mobile communication device. The mobile communication device may include an MMS client configured to generate MMS messages based on content supplied by the user applications. The MMS client may be configured to generate a value for a field of information within each MMS message that is indicative of the type of user application which supplies content for the MMS message. The value may be different for each different type of user application.

8 Claims, 3 Drawing Sheets

| Event Time | Msg Type | Interface |
| --- | --- | --- |
| 17 OCT 2007 10:54:16.363 | M_SEND_REQ | MOBILE (MM1) |
| Status | Logging Process | |
| RESPONSE_OK | $SMR10 | |
| Source Address | Source System ID | Class Of Service |
| 4087610916 | labwig.net | BASICMMS |
| Destination Address | Destination System ID | Class Of Service |
| 111222211130 | labwig.net | None |
| 9253245004 | labwig.net | BASICMMS |
| Message Body ID Export | | |
| 0362E77237FF000021000002 Type: 1 | | |

Header Content (143 octets) Export

Message Type: m-send-req
Transaction Id: <39527641.vzwmms. 4087610916>
Version: 1.0
From: +14087610916/TYPE=PLMN
To: +111222211130/TYPE=PLMN, +19253245004/TYPE=PLMN,
Orig Date: Wed Oct 17 10:58:47 2007 GMT
Subject: Test VZW MMS PIX
Message Class: MESSAGE_CLASS_PERSONAL

Header Content Raw Data (143 octets)

```
00000000:   8C  80  98  3C  33  39  35  32  37  36  34  31  2E  76  7A  77   :
... <39527641. vzw
00000010:   6D  6D  73  2E  34  30  38  37  36  31  30  39  31  36  3E  00   :
mms.4087610916>.
00000020:   8D  90  89  1A  80  18  EA  2B  31  34  30  38  37  36  31  30   :
.......+14087610
00000030:   39  31  36  2F  54  59  50  45  3D  50  4C  4D  4E  00  97  19   :
916/TYPE=PLMN...
00000040:   EA  2B  31  31  31  32  32  32  32  31  31  31  33  30  2F  54   :
. +111222211130 / T
00000050:   59  50  45  3D  50  4C  4D  4E  00  97  18  EA  2B  31  39  32   :
YPE=PLMN...+192
00000060:   35  33  32  34  35  30  30  34  2F  54  59  50  45  3D  50  4C   :
53245004/TYPE=PL
00000070:   4D  4E  00  96  12  EA  54  65  73  74  20  56  5A  57  20  4D   :
MN....Test VZW M
00000080:   4D  53  20  50  49  58  00  8A  80  85  04  47  15  EA  E7       : MS
PIX.....G...
```

*Fig. 1 (Prior Art)*

| | | |
|---|---|---|
| Event Time<br>17 OCT 2007 10:54:16.363 | Msg Type<br>M_SEND_REQ | Interface<br>MOBILE (MM1) |
| Status<br>RESPONSE_OK | Logging Process<br>$SMR10 | 301 |
| Source Address<br>4087610916 | Source System ID<br>labwig.net | Class Of Service<br>BASICMMS |
| Destination Address<br>1112222111130<br>9253245004 | Destination System ID<br>labwig.net<br>labwig.net | Class Of Service<br>None<br>BASICMMS |
| Message Body ID <u>Export</u><br>0362E77237FF000021000002 Type: 1 | | |

| Event Time | Msg Type | Interface |
| --- | --- | --- |
| 17 OCT 2007 10:54:16.363 | M_SEND_REQ   401⟶ | MOBILE (MM1) |
| Status | Logging Process | MMS User App |
| RESPONSE_OK | $SMR10 | LOCATE |
| Source Address | Source System ID | Class Of Service |
| 4087610916 | labwig.net | BASICMMS |
| Destination Address | Destination System ID | Class Of Service |
| 1112222111130 | labwig.net | None |
| 9253245004 | labwig.net | BASICMMS |
| Message Body ID Export | | |
| 0362E77237FF000021000002 Type: 1 | | |

VARIABLE BILLING OF MMS MESSAGES IN WIRELESS NETWORK COMMUNICATION SYSTEM BASED ON MESSAGE FORMATION APPLICATION

BACKGROUND

1. Technical Field

This disclosure relates to wireless network communication systems, including wireless mobile communication devices which utilize various user applications to formulate Multimedia Messaging Service (MMS) messages and billing systems for these MMS messages.

2. Description of Related Art

Wireless network communication systems may include various types of wireless mobile communication devices. These wireless mobile communication devices may formulate and transmit messages of various types, including messages known as Multimedia Messaging Service (MMS) messages. MMS messages may include rich text and multimedia objects, such as images, audio, and/or video.

A broad variety of applications may be used in various wireless mobile communication devices to formulate these MMS messages. Some applications, for example, may interface with a GPS receiver within the wireless mobile communication device for the purpose of formulating MMS messages which include information indicative of the location of the wireless mobile communication device.

These new applications create new opportunities for companies which are involved with wireless network communication systems to obtain additional revenue for the use of services offered by these new applications. Unfortunately, the protocols which are commonly used in connection with MMS messages may not allow the wireless network communication system to easily bill for the use of these new applications and the services which they provide.

SUMMARY

A wireless mobile communication device may include a transmitter configured to wirelessly transmit MMS messages over a wireless network communication system. The device may also include a plurality of user applications. Each user application may be of a different type and configured to generate content for an MMS message based on input to the wireless mobile communication device. The mobile communication device may also include an MMS client configured to generate MMS messages based on content supplied by the user applications. The MMS client may be configured to generate a value for a field of information within each MMS message that is indicative of the type of user application which supplies content for the MMS message. The value may be different for each different type of user application.

The MMS client may be configured to generate each MMS message in conformance with the MM1 interface protocol. The field of information that is indicative of the type of user application may be within the MM1 interface protocol. This field of information may the Class Of Service field within the MM1 interface protocol.

The field of information that is indicative of the type of user application may instead not be part of the MM1 interface protocol.

The wireless mobile communication device may include a GPS receiver. One of the user applications may be configured to generate content for an MMS message which includes information indicative of the location of the wireless mobile communication device based on information from the GPS receiver.

The wireless mobile communication device may include a bar code reader. One of the user applications may be configured to generate content for an MMS message which includes information indicative of a bar code which is read by the bar code reader.

The wireless mobile communication device may be a cell phone.

Computer-readable storage media may contain computer-readable program instructions which, when loaded in a wireless mobile communication device, cause the wireless mobile communication device to implement one or more of the functions described above.

A computerized billing system for a wireless network communication system may include an electronic input system configured to receive a plurality of call detail reports (CDRs) from one or more Multimedia Message System Centers (MMSCs). Each CDR may specify information about an MMS message that was sent by a wireless mobile communication device that is part of the wireless network communication system. Each CDR may contain a field of information that is indicative of the type of user application within the wireless mobile communication device which supplies content for the MMS message. The computerized billing system may include an electronic processing system configured to extract information from the field of information in each CDR which is indicative of the type of user application within the wireless mobile communication device which supplies content for the MMS message which is the subject of the CDR. The electronic processing system may be configured to generate billing information relating to the use of the wireless mobile communication device. The billing information may contain billing amounts which are dependent upon the type of user application within the wireless mobile communication device which supplies content for the MMS message which is the subject of the CDR relating to the use of the wireless mobile communication device. The computerized billing system may include an electronic output system configured to deliver the billing information.

The electronic processing system may be configured to generate billing information which contains billing amounts which are dependent upon whether one of the user applications which supplies content for an MMS message is an application which generates content for the MMS message which includes information indicative of the location of the wireless mobile communication device based on information from a GPS receiver within the wireless mobile communication device.

The electronic processing system may be configured to generate billing information which contains billing amounts which are dependent upon whether one of the user applications which supplies content for an MMS message is an application which generates content for an MMS message which includes information indicative of a bar code which is read by a bar code reader within the wireless mobile communication device.

Computer-readable storage media may contain computer-readable program instructions which, when loaded in a computerized billing system, cause the computerized billing system to perform one or more of the functions described above.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it is intended to refer to the same or like components or steps.

FIG. 1 is an example of a Multimedia Message Service (MMS) message in conformance with the MM1 interface protocol.

DETAILED DESCRIPTION OF ILLUSTRATIVE EMBODIMENTS

Illustrative embodiments are now discussed. Other embodiments may be used in addition or instead. Details that may be apparent or unnecessary may be omitted to save space or for a more effective presentation. Conversely, some embodiments may be practiced without all of the details that are disclosed.

FIG. 1 is an example of a Multimedia Message Service (MMS) message in conformance with the MM1 interface protocol.

As illustrated in FIG. 1, an MMS message that is in accordance with the MM1 interface protocol may have various fields of information and a value for each of these fields. As also illustrated in FIG. 1, the MMS message may also have Header Content and Header Content Raw Data. None of this information, however, may indicate the type of user application which may have been used to supply any of the content that is within the MMS message.

Figures 2, 3:
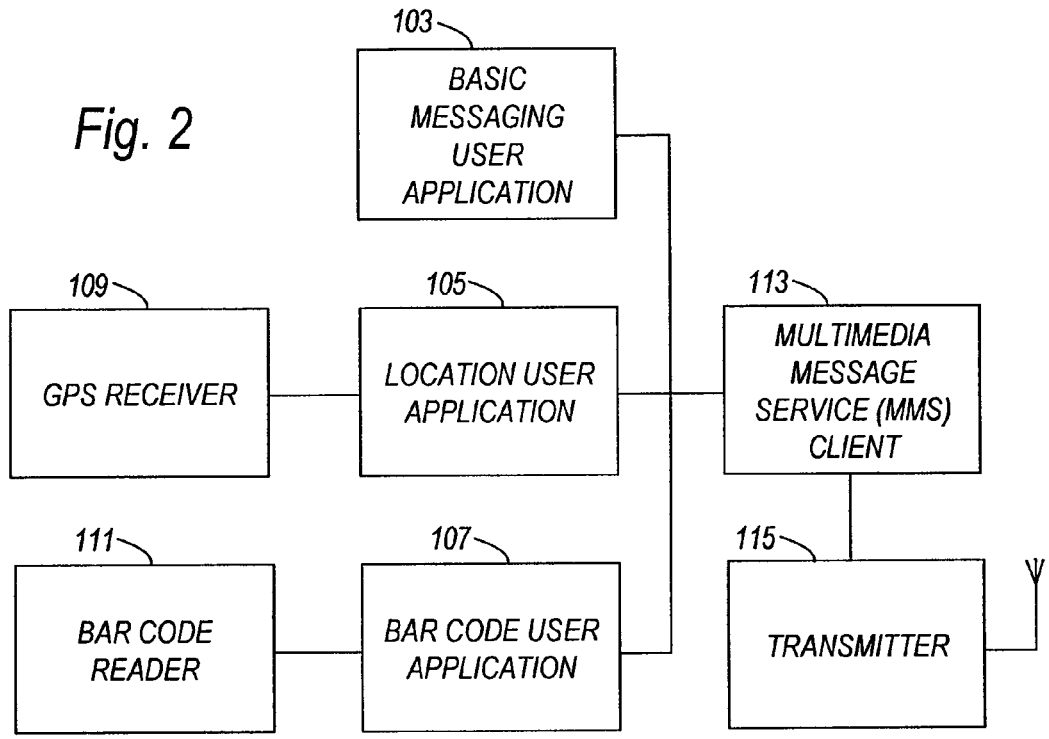
FIG. 2 is a block diagram of a wireless mobile communication device which generates a Multimedia Message Service (MMS) message and which generates a value within a field of the MMS message that is indicative of the type of user application which supplies content for the MMS message.
FIG. 3 is an example of a portion of an MMS message that has a field structure that is in conformance with the MM1 interface protocol and that has a value for a field that is indicative of the type of user application which supplied content for the MMS message.

FIG. 2 is a block diagram of a wireless mobile communication device which generates a Multimedia Message Service (MMS) message and which generates a value within a field of the MMS message that is indicative of the type of user application which supplies content for the MMS message.

The wireless mobile communication device may be of any type. For example, the wireless mobile communication device may be a cell phone or a personal digital assistant (PDA), such as a BlackBerry.

The wireless mobile communication device may include one or more user applications, such as a basic messaging user application 103, a location user application 105, and/or a bar code user application 107. Each user application may be of a type that is different from each of the other user applications. Each user application may be configured to generate content for an MMS message based on input to the wireless mobile communication device. That input may come from a user of the wireless mobile communication device and/or from another source.

The basic messaging user application 103 may be configured to receive information from a user, including a text message, which may be in rich text format, and/or one or more multimedia objects, such as one or more image files, video files, and/or audio files. One or more of these multimedia objects may come from one or more sources associated with the wireless mobile communication device, such as a camera and/or a microphone.

The location user application 105 may be configured to work in conjunction with a GPS receiver 109. The GPS receive may be configured to generate information indicative of the location of the wireless mobile communication device based on the receipt and processing of GPS signals. This information may include, for example, information concerning the latitude and longitude of the wireless mobile communication device. This information may be received by the location user application 105. The location user application 105 may be configured to provide this location information as part of the content of an MMS message.

The location user application 105 may be configured in addition or instead to translate the location information from the GPS receiver 109 into address information, such as the street address at which the wireless mobile communication device is located. To accomplish this, the location user application 105 may include a database which maps various longitudes and latitudes to street locations and/or may cause the wireless mobile communication device to access such information through a database which is remote from the wireless mobile communication device.

The location user application 105 may in addition or instead include an image map within the content of the MMS message which may graphically illustrate the location of the wireless mobile communication device, based on information from the GPS receiver 109. Again, the location user application 105 may include a local database from which such an image map may be obtained and/or may cause the wireless mobile communication device to access this image information from a remote database.

The bar code user application 107 may be configured to work in conjunction with a bar code reader 111 within the wireless mobile communication device. The bar code reader 111 may include a camera within the wireless mobile communication device. The bar code user application 107 may be configured to generate content for an MMS message which includes information indicative of a bar code which is read by the bar code reader 111. The information which is included within the content of the MMS message may be the alphanumeric bar code and/or an image of the bar code. The bar code reader 111 and/or the bar code user application 107 may include pattern recognition technology which may be configured to extract the alphanumeric bar code from a bar code image which is captured by the bar code reader 111.

The bar code user application 107 may be used for a variety of purposes. For example, the bar code user application 107 may be configured to capture a bar code from a coupon in a newspaper. The bar code user application 107 may be configured to cause this bar code with or without the coupon to be delivered by the wireless mobile communication device to another wireless mobile communication device designated by its user. This other wireless mobile communication device may be carried by another user at a remotely-located store or other establishment. The other user may then advantageously use this coupon while at this establishment.

The bar code user application 107 may be used to track assets, such as vehicles or/and shipping containers. Each asset may be marked with a bar code. As part of the tracking function, the bar code user application 107 may be configured to generate and update one or more tables which itemize the assets that are being tracked. Such tables, for example, may be stored in the form of a spreadsheet, such as in the form of an Excel spreadsheet. The bar code user application 107 may be configured to include one or more of such spreadsheets within the content of the MMS message which is generated by the bar code user application 107.

A broad variety of additional or different user applications may be included within the wireless mobile communication device. These may include one or more user applications relating to entertainment, finance, and/or productivity.

Each user application may be implemented by computer-readable program instructions which may be configured to implement the functions of each application, such as the functions which are described above. These computer-readable program instructions may be stored within one or more memory devices within the mobile communication device, such as one or more ROMs, PROMs, ePROMS, flash memories, hard disks, and/or RAMS. Each mobile communication device may include one or more electronic processing systems which may include these memory devices and one or more electronic processors which are configured to process each of the program instructions and to implement the instructions which they specify.

The wireless mobile communication device may include a Multi Message Service (MMS) client 113. The MMS client 113 may be configured to generate MMS messages based on content supplied by each of the user applications, such as the basic messaging user application 103, the location user application 105, and the bar code user application 107.

The MMS client 113 may be configured to generate a value for a field of information within each MMS message which is indicative of the type of user application which supplies the content for the MMS message. This value may be different for each different type of user application. The MMS client 113 may generate these unique values, based on knowledge of which user application is providing content for the MMS message, and/or based on information about the field of information which is provided by the user application.

The MMS client 113 may be configured to generate each MMS message in conformance with the MM1 interface protocol. This may include a field structure that is in conformance with the MM1 interface protocol.

FIG. 3 is an example of a portion of an MMS message that has a field structure that is in conformance with the MM1 interface protocol and that has a value for a field—the Class Of Service field 301—that is indicative of the type of user application which supplied content for the MMS message. When the user application supplying content for the MMS message is a location application, such as the location user application 105, for example, the value of the Class Of Service field 301 may be set to a name which is indicative of this type of user application, such as to LOCATEMMS, as illustrated in FIG. 3. Of course, a broad variety of other values could be used instead to represent this type of user application.

When the content-supplying user application is of a different type, the value which is placed in the Class Of Service field 301 may be different. For example, when the user application provides bar codes, such as the bar code user application 107, the value of the Class Of Service field 301 may be set by the MMS client 113 to be BARCODEMMS. Again, of course, the value could be much different.

Similarly, the value which is placed within the Class Of Service field 301 may be indicative of another type of user application when another type of user application supplied the content for the MMS message. For example, a financial application may be indicated by the value FINANCIAL-MMS, an entertainment application may be indicated by a value such as ENTERTAINMMS, and a productivity application may be indicated by a value such as PRODMMS. Again, a broad variety of different values may be used to indicate the various different types of user applications.

A field of information within the MM1 interface protocol other than the Class Of Service field 301 may instead be used to store the value which is indicative of the type of user application which supplies content for the MMS message. The values which have traditionally appeared within the other fields may continue to be present, with the value representing the type of user application being added or otherwise integrated as a part of the total value that is placed within that particular field.

Figures 4, 5:
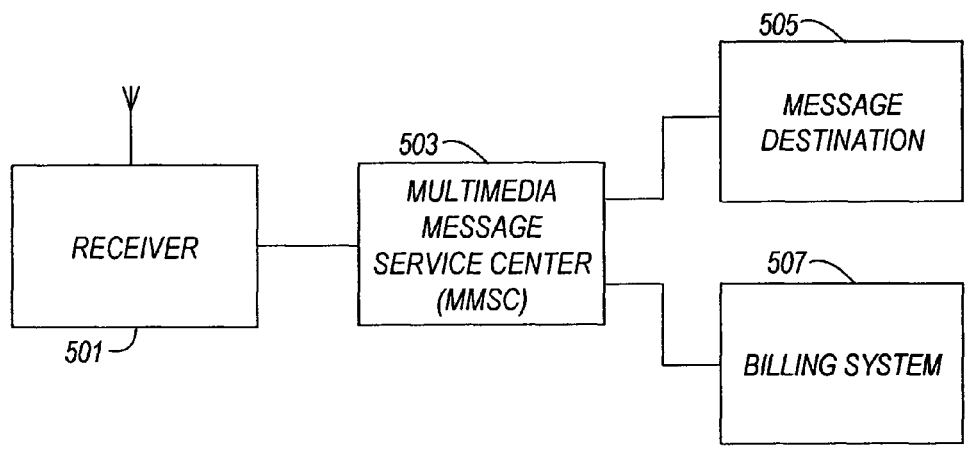
FIG. 4 is an example of a portion of an MMS message that has a field structure that is not in conformance with the MM1 interface protocol and that has a value for a field that is indicative of the type of user application which supplied content for the MMS message.
FIG. 5 is a block diagram of a portion of a wireless network communication system which receives and processes Multimedia Message Service (MMS) messages which may include a field within the MMS message that is indicative of the type of user application which supplies content for the MMS message.

FIG. 4 is an example of a portion of an MMS message that has a field structure that is not in conformance with the MM1 interface protocol and that has a value for a field that is indicative of the type of user application which supplied content for the MMS message. As illustrated in FIG. 4, the field of information that is indicative of the type of user application for which the MMS client may be configured to generate the value may not be a field of a type that is within the MM1 interface protocol. Instead, such a field may be added to the MMS message by the MMS client 113. This field may bear any name, such as MMS User App field 401, as illustrated in FIG. 4. Other names, of course, may be used instead. The location of the added field may also vary. More than a single field may also be added.

The MMS client 113 may be configured to specify the value of the field MMS User App field 401 such that the value is indicative of the type of user application which supplies content for the MMS message. Values similar to those which have been discussed above in connection with the Class Of Service field 301 may be used, as well as other values. The suffix "MMS" may be omitted, as illustrated in the example in FIG. 4. As also illustrated in FIG. 4, the other portions of the MMS message may be entirely consistent with the MM1 interface protocol.

The MMS client 113 may be implemented by computer-readable program instructions which may be configured to implement the functions of the MMS client 113, such as the functions which are described above. These computer-readable program instructions may be stored within one or more memory devices within the mobile communication device, such as one or more ROMs, PROMs, ePROMS, flash memories, hard disks, or RAMS. The MMS client 113 may include one or more electronic processing systems which may include these memory devices and one or more electronic processors which are configured to process each of the program instructions and to implement the instructions which they specify.

Returning to FIG. 2, the wireless mobile communication device may include a transmitter 115. The transmitter may be of any type and may be configured to wirelessly transmit the MMS message created by the MMS client 113 to a portion of a wireless network communication system which receives and processes these MMS messages. The wireless mobile communication device may also include other components which may be used in connection with the transmitter 115 to encode the message, to otherwise prepare it for transmission, and/or to protect the integrity of the transmission.

FIG. 5 is a block diagram of a portion of a wireless network communication system which receives and processes Multimedia Message Service (MMS) messages which may include a field within the MMS message that is indicative of the type of user application which supplies content for the MMS message.

As illustrated in FIG. 5, this portion of the wireless network communication system may include a receiver 501. The receiver 501 may be of any type and may be configured to wirelessly receive MMS messages which are wirelessly transmitted by one or more wireless mobile communication devices, such as the one illustrated in FIG. 2.

Some wireless network communication systems may have several receivers, each configured to perform a similar function. The receiver which is used to communicate with a particular wireless mobile communication device may change as the location of the wireless mobile communication device changes and/or as other circumstances change.

The receiver which is receiving the MMS message from the wireless mobile communication device, such as the receiver 501, may be configured to deliver the message which is received to a Multimedia Message Service Center (MMSC), such as the Multimedia Message Service Center (MMSC) 503. The MMSC 503 may be configured to route the MMS message to the destination for the message which may be indicated in the message, such as to a message destination 505.

The message destination may be of any type. For example, the message destination may be an email server. It may in addition or instead be another wireless mobile communication device, such as a cell phone.

The MMSC 503 may be configured to generate a call detail record (CDR). Each CDR may specify information about the MMS message with which it is associated, such as information about the wireless mobile communication device from which the MMS message originated and the destination which is to receive the MMS message. Each CDR may contain a field of information that is indicative of the type of user application within the wireless communication device which supplied content for the MMS message.

The field of information which is used in the CDR to specify the type of user application which supplied content for the MMS message may vary. In one configuration, the field may be an existing field within the CDR, such as a field that reflects the value of the class of service which was contained in the Class Of Service field of the MMS message, such as the Class Of Service field 301 illustrated in FIG. 3. In this configuration, the MMSC 503 may not need to be modified to provide a value within this field that is indicative of the type of user application which supplied content for the MMS message, if the wireless mobile communication device which supplied the message was configured to use this field for communicating that value, as illustrated in FIG. 3 and discussed above.

In other configurations, the MMSC 503 may be configured to add a new field to the CDR and to place the value which is indicative of the user application which supplied content for the MMS message within this new field.

The MMSC 503 may be implemented by computer-readable program instructions which may be configured to implement the functions of the MMSC 503, such as the functions which are described above. These computer-readable program instructions may be stored within one or more memory devices within the network communication system, such as one or more ROMs, PROMs, ePROMS, flash memories, hard disks, or RAMS. The MMSC 503 may include one or more electronic processing systems which may include these memory devices and one or more electronic processors which are configured to process each of the program instructions and to implement the instructions which they specify. The MMSC 503 may also include an electronic input system, such as a network interface card and associated packet processing technology, which may be configured to receive the MMS messages which are processed by the MMSC. The MMSC 503 may include an electronic output system, such as a network interface card and associated packet addressing technology, which may be configured to address and deliver the MMS messages to message destinations, such as to the message destination 505, and to deliver each CDR to a computerized billing system, such as to the computerized billing system 507.

One or more computerized billing systems may be part of the network communication system, such as the computerized billing system 507. The computerized billing system 507 may be configured to receive one or more of the CDRs generated by the MMSC 503, as well as one or more of the CDR's which may be generated by other MMSCs and/or other types of devices within the network communication system.

The computerized billing system 507 may be configured to extract information from the field of information within each CDR which is indicative of the type of user application within the wireless mobile communication device which supplied content for the MMS message which is the subject of the CDR.

The computerized billing system 507 may be configured to generate billing information relating to the use of wireless mobile communication devices. This billing information may contain billing amounts which are dependent upon the type of each user application within the wireless mobile communication device which supply content for each MMS message which is the subject of each CDR.

The computerized billing system 507 may be configured to perform other functions, such as accounting functions and reporting functions. The computerized billing system 507 may be configured to perform mediation functions, such as identifying systems to which each CDR should be delivered. The computerized billing system 507 may be configured to perform rating functions, such as to determine what amounts should be charged for each MMS message based on the plan to which the originator of the MMS message may have subscribed.

The amount which is billed by the computerized billing system 507 to the originator of each MMS message may vary depending upon the type of user application within the wireless mobile communication device which supplied content for the MMS message. For example, the computerized billing system 507 may be configured to assess an additional charge against the originator of the MMS message if the content of the message was at least in part supplied by a location application, such as the location user application 105 illustrated in FIG. 2 and discussed above. Similarly, the computerized billing system 507 may be configured to assess an additional charge if the content of the MMS message was at least in part provided by a bar code application, such as the bar code user application 107. The amount of these charges may be the same or different. Other charges may similarly be imposed by the computerized billing system 507 in connection with other types of user applications, again in equal or different amounts.

The computerized billing system 507 may be implemented by computer-readable program instructions which may be configured to implement the functions of the computerized billing system 507, such as the functions which are described above. These computer-readable program instructions may be stored within one or more memory devices within the network communication system, such as one or more ROMs, PROMs, ePROMS, flash memories, hard disks, or RAMS. The computerized billing system 507 may include one or more electronic processing systems which may include these memory devices and one or more electronic processors which are configured to process each of the program instructions and to implement the instructions which they specify. The computerized billing system 507 may include an electronic input system, such as a network interface card and associated packet processing technology, which may be configured to receive CDRs from the MMSC 503, as well as from other MMSCs. The computerized billing system 507 may include an electronic output system, such as a network interface card and associated packet addressing technology, which may be configured to address and deliver the billing information to another system or systems.

The computer-readable program instructions which have been described herein may in whole or in part be stored on computer-readable storage media, such as one or more ROMS, RAMS, PROMS, ePROMS, flash memories, CDs, DVDs, and/or hard disk drives.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The phrase "means for" when used in a claim is intended to and should be interpreted to embrace the corresponding structures and materials that have been described and their equivalents. Similarly, the phrase "step for" when used in a claim embraces the corresponding acts that have been described and their equivalents. The absence of these phrases means that the claim is not intended to and should not be interpreted to be limited to any of the corresponding structures, materials, or acts or to their equivalents.

Nothing that has been stated or illustrated is intended or should be interpreted to cause a dedication of any component, step, feature, object, benefit, advantage, or equivalent to the public, regardless of whether it is recited in the claims.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

The invention claimed is:

1. A wireless mobile communication system comprising:
a wireless mobile communication device comprising:
a transmitter configured to wirelessly transmit MMS messages over a wireless network communication system;
a plurality of user applications, each of a different type and each configured to generate content for an MMS message based on input to the wireless mobile communication device;
an MMS client configured to generate MMS messages based on content supplied by the user applications, the MMS client being configured to generate a value for a field of information within each MMS message that is indicative of the type of user application which supplies content for the MMS message and that is different for each different type of user application; and
a computerized billing system comprising:
an electronic input system configured to receive a plurality of call detail reports (CDRs) from one or more multimedia message system centers, each CDR specifying information about an MMS message that was sent by the wireless mobile communication device that is part of the wireless network communication system and containing a field of information that is indicative of the type of user application within the wireless mobile communication device which supplies content for the MMS message;
an electronic processing system configured to:
extract information from the field of information in each CDR which is indicative of the type of user application within the wireless mobile communication device which supplies content for the MMS message which is a subject of the CDR; and
generate billing information relating to use of the wireless mobile communication device which contains billing amounts which are dependent upon the type of each user application within the wireless mobile communication device which supplies content for each MMS message which is the subject of each CDR relating to the use of the wireless mobile communication device; and
an electronic output system configured to deliver the billing information.

2. The wireless mobile communication system of claim 1 wherein the electronic processing system is further configured to generate billing information which contains billing amounts which are dependent upon whether one of the user applications which supplies content for an MMS message is an application which generates content for the MMS message which includes information indicative of a location of the wireless mobile communication device based on information from a GPS receiver within the wireless mobile communication device.

3. The wireless mobile communication system of claim 1 wherein the electronic processing system is further configured to generate billing information which contains billing amounts which are dependent upon whether one of the user applications which supplies content for an MMS message is an application which generates content for an MMS message which includes information indicative of a bar code which is read by a bar code reader within the wireless mobile communication device.

4. The wireless mobile communication system of claim 1 wherein the wireless mobile communication device is a cell phone.

5. Non-transitory, tangible, computer-readable storage media containing computer-readable program instructions which, when loaded in a wireless mobile communication device containing:

a transmitter configured to wirelessly transmit MMS messages over a wireless network communication system and a plurality of user applications, each of a different type and each configured to generate content for an MMS message based on input to the wireless mobile communication device, cause the wireless mobile communication device to provide a function of an MMS client which generates MMS messages based on content supplied by the user applications and which generates a value for a field of information within each MMS message that is indicative of the type of user application which supplies content for the MMS message and that is different for each different type of user application, wherein the program instructions include instructions which, when loaded in a computerized billing system, cause the computerized billing system to:

receive a plurality of call detail reports (CDRs) from one or more Multimedia Message System Centers (MMSC), each CDR specifying information about an MMS message that was sent by a wireless mobile communication device that is part of the wireless network communication system and containing a field of information that is indicative of the type of user application within the wireless mobile communication device which supplies content for the MMS message;

extract information from the field of information in each CDR which is indicative of the type of user application within the wireless mobile communication device which supplies content for the MMS message which is a subject of the CDR; and generate billing information relating to use of the wireless mobile communication device which contains billing amounts which are dependent upon the type of each user application within the wireless mobile communication device which supplies content for each MMS message which is the subject of each CDR relating to the use of the wireless mobile communication device; and delivers the billing information.

6. The non-transitory, tangible, computer-readable storage media of claim 5 wherein the computer-readable program instructions which, when loaded in the computerized billing system, cause the computerized billing system to generate billing information which contains billing amounts which are dependent upon whether one of the user applications which supply content for an MMS message is an application which generates content for the MMS message which includes information indicative of a location of the wireless mobile communication device based on information from a GPS receiver within the wireless mobile communication device.

7. The non-transitory, tangible, computer-readable storage media of claim 5 wherein the computer-readable program instructions which, when loaded in the computerized billing system, cause the computerized billing system to generate billing information which contains billing amounts which are dependent upon whether one of the user applications which supplies content for an MMS message is an application which generates content for an MMS message which includes information indicative of a bar code which is read by a bar code reader within the wireless mobile communication device.

8. The non-transitory, tangible, computer-readable storage media of claim 5 in which the wireless mobile communication device is a cell phone.

* * * * *